(No Model.)

J. BELL.
BALL BEARING AXLE.

No. 514,434. Patented Feb. 13, 1894.

Witnesses
H. G. McMillan
L. Foulds

Inventor
Jno. Bell
by C. H. Rickes
his atty

UNITED STATES PATENT OFFICE.

JOHN BELL, OF TORONTO, CANADA.

BALL-BEARING AXLE.

SPECIFICATION forming part of Letters Patent No. 514,434, dated February 13, 1894.

Application filed October 5, 1893. Serial No. 487,304. (No model.)

*To all whom it may concern:*

Be it known that I, JOHN BELL, carriage-builder, of the city of Toronto, in the county of York and Province of Ontario, Canada, have invented certain new and useful Improvements in Ball-Bearing Axles; and I hereby declare that the following description is sufficiently full, clear, and exact as to enable others skilled in the art to which it appertains to make and use the same.

The object of this invention is to devise a ball bearing axle adapted for use in all classes of wheels, but more particularly for use in vehicle and bicycle wheels and by means of which the wheel can be removed from the axle without the necessity of removing or displacing the balls, thus removing the only objection which has hitherto been made in regard to the use of ball bearings; the whole device being constructed and arranged as hereinafter more fully set forth and more particularly pointed out in the claims.

Figure 1:
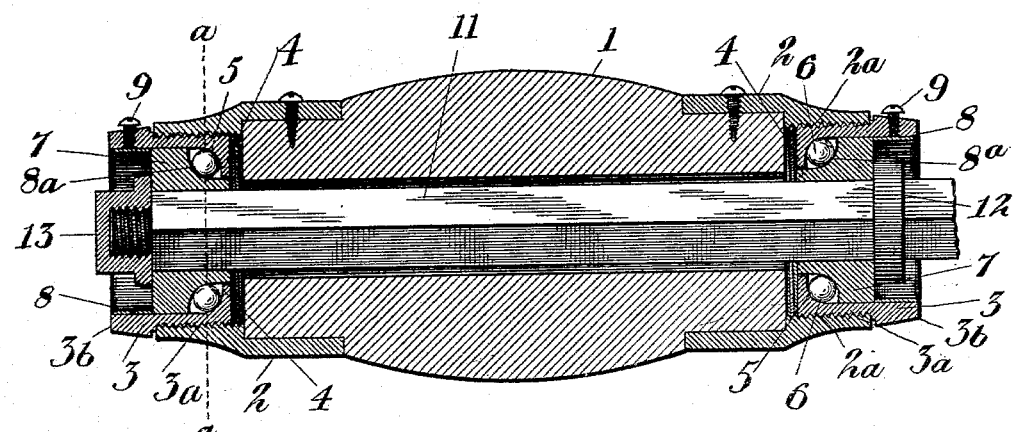
Figure 2:
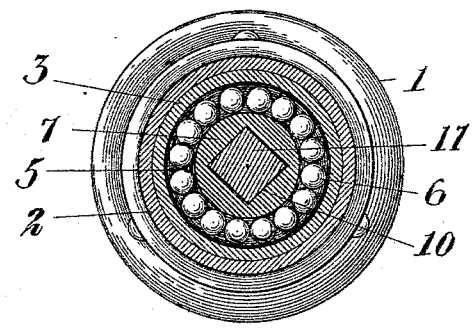

In the drawings: Figure 1 is a transverse sectional view of a vehicle hub and bearing. Fig. 2 is a cross sectional view on the line $a$—$a$ Fig. 1.

Like numerals of reference refer to like parts throughout the specification and drawings.

The improvements as shown in the drawings have been applied to a vehicle hub, but the same improvements are also applicable to any other class of wheel and more particularly to a bicycle wheel.

Encircling each end of the hub 1 is a collar 2 and each of these collars it might be stated projects sufficiently beyond its respective end of the hub 1 to receive the ball bearings and bearing case. The inner face of the outer end $2^a$ of each of the collars 2 is screw-threaded and fitted within the outer end $2^a$ of each of the collars 2 is a bearing case 3. The outer diameter of each of the bearing cases 3 is the same as the inner diameter of each of the ends $2^a$. The outer face of the inner end $3^a$ of each of the bearing cases 3 is screw-threaded to correspond with the screw-threads on the inner face of each of the ends $2^a$ in order that each of the bearing cases 3 can be readily fitted into and securely held in its respective end.

To facilitate the insertion and removal of each of the bearing cases 3 respectively into or from its respective end $2^a$ each of the bearing cases 3 is provided at its outer end with a polygonal shaped nut $3^b$ to which can be applied a wrench or other tool. The inner end of each of the bearing cases 3 is partially closed by an annular plate 4 which may either be formed integrally with or subsequently fitted to the bearing case. Within the bearing case 3 and at its inner end is a hardened bearing surface 5 for the balls 6 to run on. Removably locked within the bearing case 3 is a coned bearing 7, and securely locking the coned bearing within the bearing case is a ring 8 tightly fitting the outer end of the bearing case 3 and held in place by a set screw 9. It will be noticed that the coned bearing has formed through it a rectangular shaped opening 10 to receive a correspondingly shaped axle 11. I do not, however, confine myself to the use of any particular shaped opening 10 or axle 11 as I may make use of any other shape or shapes suitable for the purpose as long as the axle and the coned bearing can be separably locked together thereby.

It might here be stated that each of the coned bearings 7 remains stationary on the axle 11 and that the balls 6 running upon the bearing surfaces $8^a$ and bearing surfaces 5 relieve the device from unnecessary friction. It might also here be stated that the axle passes through each of the coned bearings 7 and is fitted on its inner end with a dust collar 12 and on its outer end with a nut 13. In this construction the balls and the several parts of the bearing are securely locked within the hub, and owing to this fact the wheel can be removed from the axle at pleasure without danger of losing the ball or the balls becoming displaced, and the wheel can also be replaced in the same convenient manner.

Having thus fully described my invention, what I claim as new, and desire to secure by Letters Patent, is—

1. The combination of the hub, a collar encircling each end of the hub, secured thereto and projecting therebeyond, a bearing case fitted into each collar and locked thereto, said bearing case having a bearing surface, a coned bearing within the bearing case, means for revolubly locking the coned bearing within the bearing case, said coned bearing having a bearing surface, balls running upon the said bearing surfaces, the axle, and means for separably locking the axle to the coned bearings, substantially as and for the purpose specified.

2. In a ball bearing axle the combination of the hub a collar secured to each end of the hub and projecting therebeyond, each of said collars screw threaded on its inner face bearing cases threaded on their outer faces and one screwed into each of said collars, said bearing case having a bearing surface, a coned bearing within each bearing case, said coned bearing having a bearing surface, means for revolubly locking each coned bearing within its respective bearing case, each coned bearing having a rectangular shaped opening formed therethrough, a rectangular shaped axle passing through the openings in the coned bearings, and adapted to fit the said openings to hold the coned bearings with it, a nut fitting the outer end of the axle, and balls running upon the said bearing surfaces, substantially as and for the purpose specified.

Toronto, September 11, 1893.

JOHN BELL.

Witnesses:
C. H. RICHES,
L. FOULDS.